(12) United States Patent
Ma et al.

(10) Patent No.: US 7,558,404 B2
(45) Date of Patent: Jul. 7, 2009

(54) DETECTION OF ABNORMAL CROWD BEHAVIOR

(75) Inventors: Yunqian Ma, Roseville, MN (US); Michael E. Bazakos, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 646 days.

(21) Appl. No.: 11/287,627

(22) Filed: Nov. 28, 2005

(65) Prior Publication Data

US 2007/0121999 A1 May 31, 2007

(51) Int. Cl.
G06K 9/00 (2006.01)
H04N 7/18 (2006.01)
H04N 5/225 (2006.01)

(52) U.S. Cl. .................. 382/103; 348/157; 348/169
(58) Field of Classification Search .................. 382/103, 382/107, 149, 236, 287; 348/94, 152, 154, 348/155, 169, 170, 171, 172, 208.1, 208.2, 348/208.14, 347, 352, 353, 356, 465, 579; 714/39
See application file for complete search history.

(56) References Cited

U.S. PATENT DOCUMENTS 6,118,887 A * 9/2000 Cosatto et al. .............. 382/103
6,721,454 B1 * 4/2004 Qian et al. .................. 382/224
7,133,537 B1 * 11/2006 Reid .......................... 382/103
2003/0058111 A1 3/2003 Lee et al.
2005/0105765 A1 * 5/2005 Han et al. .................. 382/100
2006/0233461 A1 10/2006 Ma et al.

FOREIGN PATENT DOCUMENTS

WO WO-02/43352 A2 5/2002
WO WO-0243352 A2 5/2002
WO WO-2004003848 A2 1/2004

OTHER PUBLICATIONS

MacDorman, K., et al., "A Memory Based Distributed Vision System That Employs a Form of Attention to Recognise Group Activity at a Subway Station", *Intelligent Robots and Systems,2004*, (2004), 1704-1709.
Viola, Paul, et al., "Detecting Pedestrians Using Patterns of Motion and Appearance", (Jul. 2003), 10 pgs.
"European Application Serial No. 06838349.6, Office Action mailed Nov. 6, 2008", 8 pgs.
"International Application Serial No. PCT/US2006/045330, International Search Report mailed Apr. 3, 2007", 3pgs.

* cited by examiner

*Primary Examiner*—Abolfazl Tabatabai
(74) *Attorney, Agent, or Firm*—Kris T. Fredrick

(57) ABSTRACT

A system and method detects the intent and/or motivation of two or more persons or other animate objects in a video scene. In one embodiment, the system forms a blob of the two or more persons, draws a bounding box around said blob, calculates an entropy value for said blob, and compares that entropy value to a threshold to determine if the two or more persons are involved in a fight or other altercation.

20 Claims, 4 Drawing Sheets

DETECTION OF ABNORMAL CROWD BEHAVIOR

TECHNICAL FIELD

Various embodiments relate to the field of video data processing, and in particular, but not by way of limitation, to context-based scene interpretation and behavior analysis.

BACKGROUND

Video surveillance systems are used in a variety of applications to detect and monitor objects within an environment. For example, in security applications, such systems are sometimes employed to detect and track individuals or vehicles entering or leaving a building facility or security gate, or to monitor individuals within a store, office building, hospital, or other such setting where the health and/or safety of the occupants may be of concern. A further example is the aviation industry, where such systems have been used to detect the presence of individuals at key locations within an airport such as at a security gate or in a parking garage. Yet another example of video surveillance is the placement of video sensors in areas of large crowds to monitor crowd behavior. Also, video surveillance may use a network of cameras that cover, for example, a parking lot, a hospital, or a bank.

In recent years, video surveillance systems have progressed from simple human monitoring of a video scene to automatic monitoring of digital images by a processor. In such a system, a video camera or other sensor captures real time video images, and the surveillance system executes an image processing algorithm. The image processing algorithm may include motion detection, motion tracking, and object classification.

While motion detection, motion tracking, and object classification have become somewhat commonplace in the art of video surveillance, and are currently applied to many situations including crowd surveillance, current technology does not include systems having intelligence to deduce and/or predict the intent of an interaction between two or more subjects in a video scene based on visual observation alone. For example, current technology does not provide the ability to determine and/or interpret the intent or actions of people in a video scene (e.g., whether two or more persons in a video sequence are involved in a fight, engaged in a conversation, or involved in some other activity). The current state of the art does not enable such detection for at least the reason that when two people fight, current video motion detection systems only detect one blob, from which the intent of the two subjects cannot be determined.

The art is therefore in need of a video surveillance system that goes beyond simple motion detection, motion tracking, and object classification, and intelligently determines the motive and/or intent of people in a video scene.

SUMMARY

In an embodiment, a system and method uses a multi-state combination (a temporal sequence of sub-states) to detect the intent of two or more persons in a field of view of a video image. That is, one or more methods disclosed herein detect and track groups of people and recognize group behavior patterns. In one particular embodiment, the system determines if the two or more persons in the field of view are engaged in a fight or similar altercation. In a first sub-state, the system initially tracks objects in the field of view of the image sensor. In a second sub-state, the system classifies those objects for the purpose of identifying the tracked objects that are human. In a third sub-state, the system determines if and when two or more tracked persons become one group. If a grouping of two or more persons is detected, group tracking is used to track all the persons in the formed group. In a fourth sub-state, the system examines both the location and speed (e.g., the speed of fast and repetitive movement of arms characteristic in a fight) of the group as compared to a threshold. Then, in a fifth sub-state, the system computes the spatial and temporal entropy of the image, normalizes that entropy, and compares the normalized entropy to a threshold to determine if a fight or other altercation is taking place, or if some other social interaction is taking place in the scene.

DETAILED DESCRIPTION

Figure 1:
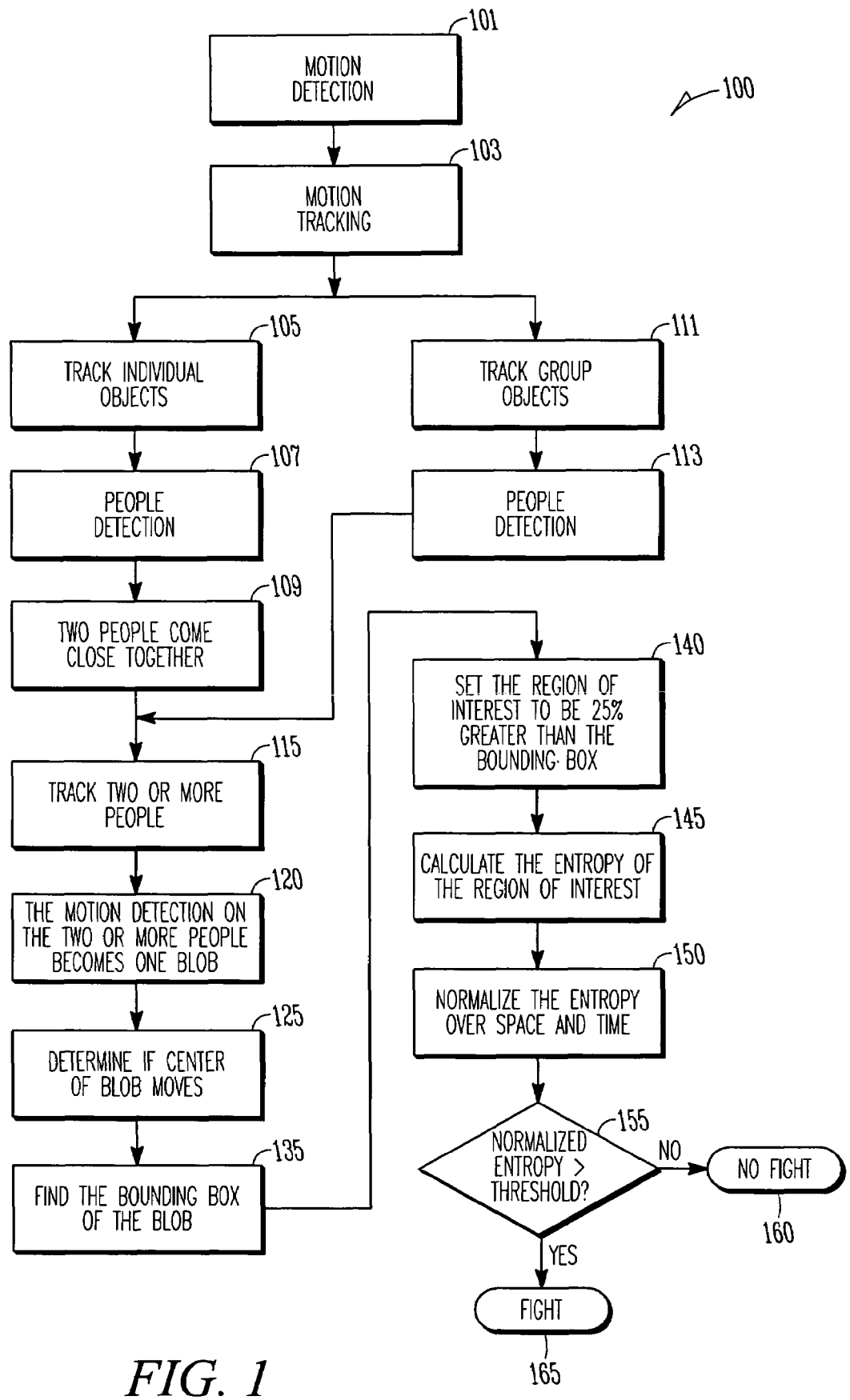
FIG. 1 illustrates an example embodiment of a process to determine if two or more people in a video scene are involved in a fight or other altercation.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 illustrates an example embodiment of a system and method 100 to determine the intent, motivation, and/or actions of two or more persons in a video scene. The example embodiment is directed to determining if the intent of two or more persons in a video scene involves a fight or similar altercation between the individuals. However, the scope of the invention is not so limited, and various embodiments could be applied to the intelligent detection of other encounters between two or more individuals.

Referring to the embodiment of FIG. 1, the system 100 has a motion detection module 101 and a motion tracking module 103. The motion detection module 101, also referred to in the art as moving object detection or background subtraction, automatically discerns the foreground in the field of view of the camera. The foreground typically includes interesting objects under surveillance, such as people, vehicles and animals. The motion tracking module 103 determines the correlation among moving objects between consecutive frames. The motion tracking module 103 assigns a unique identification (track ID) to the tracked object from the time that the tracked object enters the scene to the time that the tracked object exits the scene. The tracked object can be a single physical object, such as a tracked person or a tracked vehicle. The tracked object can also be a group of people. It should be noted that there is more than one system and method available in the art to detect and track the motion thereof in a field of view of a video sensor, and the selection of which one to use in connection with embodiments of the present invention is not critical.

In one embodiment, the output of motion tracking operation 103 is a group of tracked objects 111, that is, the individual objects can not be tracked separately. In such a case, operation 113 performs a people detection algorithm. In one embodiment, the people detection module is trained using the Adaboost method for the detection of people ("Detecting Pedestrians Using Patterns of Motion and Appearance," International Conference on Computer Vision, Oct. 13, 2003, which is incorporated herein in its entirety by reference). In this embodiment, to detect people, an exhaustive search over the entire image at every scale is not required. Only a search on the output of operation 103 is performed. That is, the region of interest to be searched is the tracked group of objects. The output of operation 113 is that it will be known that the tracked group includes two or more people.

In another embodiment, the output of motion tracking module 103 is a single tracked object 105. In this case, operation 107 performs a people detection algorithm to verify that the tracked object is a person. If the tracked object is a person, the system continues to track that person until that person exits the video scene, or that person comes in close contact with another person at operation 109. That is, at some point in time, the system may detect at operation 109 that two or more persons in the field of view have come close enough to each other such that the motion detection and tracking modules detect the two or more persons as one blob.

In either of the two situations just described, that is, whether an individual object is tracked or a group of objects are tracked, embodiments of the invention cover the possible cases when two or more persons come together and are tracked together at operation 115, and then become one tracked blob at operation 120. Thereafter, the system commences its fight detection capabilities.

In an embodiment, the system 100, at operation 125, then determines if the center of the blob is substantially stationary from frame to frame in the field of view. If it is determined at operation 125 that the center of the blob is substantially stationary, this indicates at least that the two or more persons in the video scene are remaining in close proximity to each other, and further indicates that the two or more persons could possibly be involved in an altercation.

If the system 100 determines at operation 125 that the individuals could be involved in a fight, a bounding box is drawn around the blob at operation 135. In an embodiment, a region of interest is set to be approximately 25% greater than the minimum bounding region at operation 140. By setting the region of interest to be approximately 25% outside the minimum bounding region, the system allows for a certain amount of movement within the minimum bounding region for the individuals involved in the altercation. This is helpful in embodiments in which the video sensor, and in particular the field of view, does not move. Then, even if the center of the blob moves outside the region of interest, a person or persons' arms or legs may still be in the region of interest (which in this embodiment does not change). The 25% increase in the region of interest is just an example embodiment, and other percentages could be used (including 0%). The selection of the percentage increase in the minimum bounding region, as in many engineering applications, involves a tradeoff. Increasing the region of interest captures more of the scene for analysis, but adds to the computational load of the system.

After the setup of a region of interest at operation 140, an entropy is calculated throughout the region of interest at operation 145. In an embodiment, this calculation is as follows. Let I(x, y, t) be the intensity at image coordinate (x, y) on time t. The entropy, which may be referred to as the Epsilon-Insensitive Entropy, can be calculated in two manners, either on a per pixel level or a sub-window level.

To calculate the Epsilon-Insensitive Entropy on a per pixel basis, for every pixel (x, y) ∈B, we perform the following $$D(x, y, t) = \begin{cases} 1 & \text{if } |I(x, y, t) - I(x, y, t - \tau)| > \varepsilon \\ 0 & \text{otherwise} \end{cases} \quad (1)$$

D(x, y, t) describes the significant change of intensity for each pixel, $\varepsilon$ is a statistical variance, and $\tau$ is the time interval. In the following expression, $S_B$ is denoted to be the size of region of interest B, and T is denoted to be the temporal duration of the entropy that is calculated after normalization. In an embodiment, T should be large enough to encompass the temporal extent of the behavior.

$$\text{entropy} = \frac{1}{T} \frac{1}{S_B} \sum_t \sum_{(x,y) \in B} D(x, y, t) \quad (2)$$

Figure 2A:
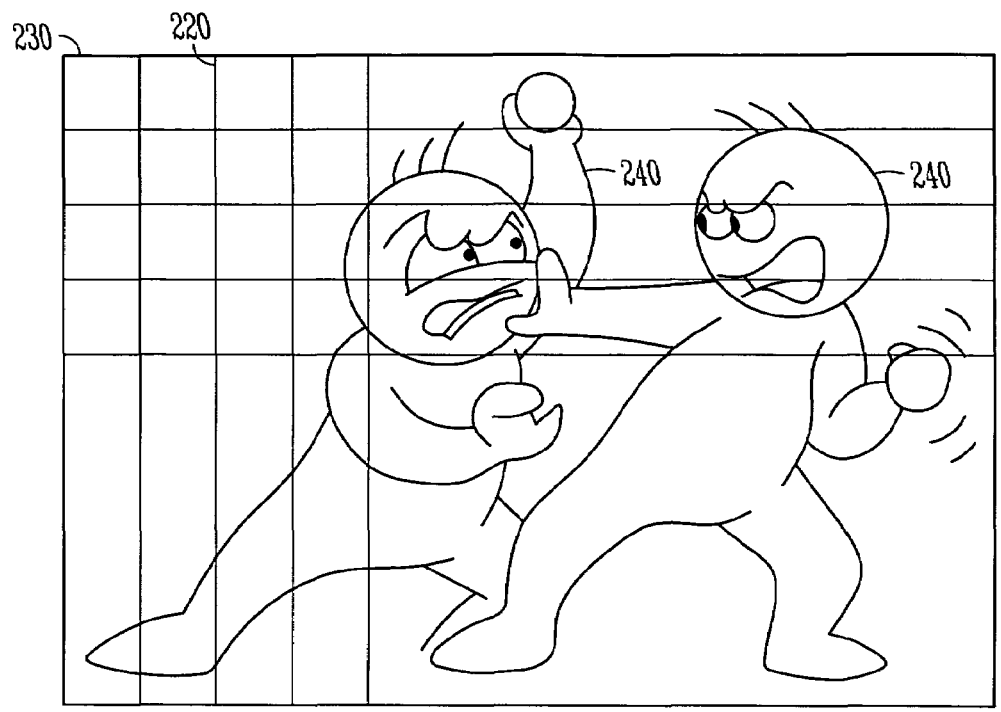
FIG. 2A illustrates a video scene in which a region of interest is small compared to the field of view.

The calculation of entropy on a per pixel basis is suitable in situations in which the size of the persons in the image are small (compared to the size of the field of view), such as 20*40 pixels. This is illustrated in FIG. 2A, in which the people 240 in a region of interest 230, are relatively small compared to the entire field of view, and as such individuals pixels 220 may be used in the comparison.

Figure 2B:
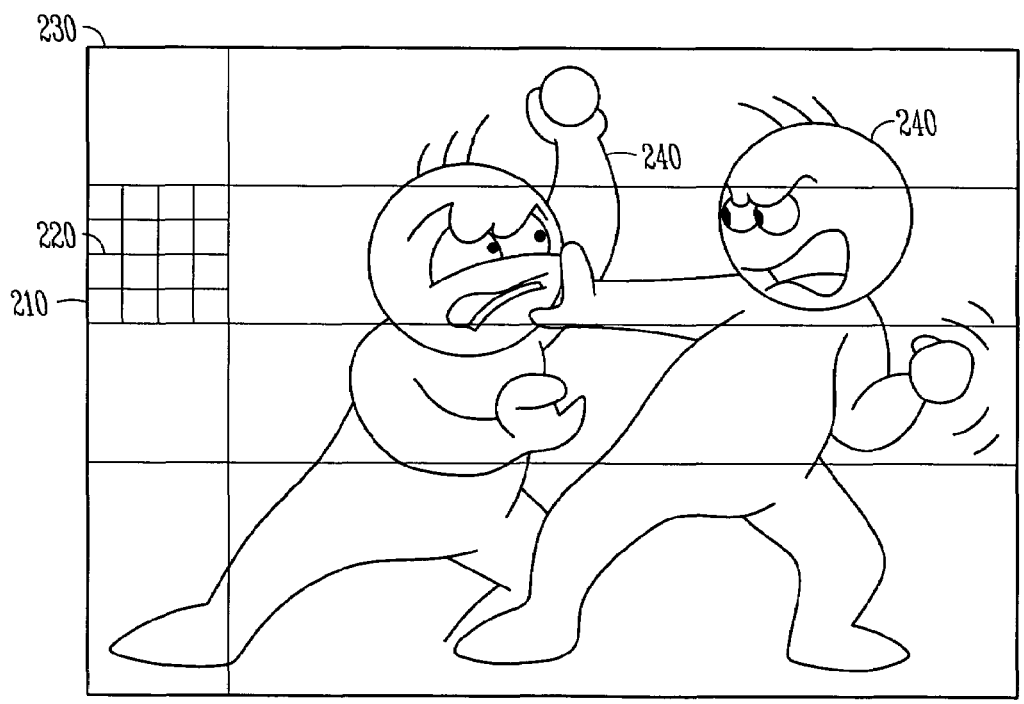
FIG. 2B illustrates a video scene in which a region of interest is large compared to the field of view.

In another embodiment, the entropy is calculated on a sub-window basis. In this embodiment, the region of interest and the people are relatively large compared to the field of view. That is, the image of the people in pixels is relatively large, such as 100*200 pixels. In such embodiments, incoming video frames are divided into sub-windows as in FIG. 2B. In the embodiment of FIG. 2B, there are four rows and four columns of pixels 220 in a sub-window 210. FIG. 2B shows a region of interest 230 in which the subjects 240 are relatively large compared to the field of view and also relatively large compared to the pixels 220. In an example of a situation like that of FIG. 2B, if the size of the region of interest 230 is 160 pixels, the size of one sub-window may be 16 pixels, and the region of interest 230 would have 10 sub-windows. Therefore, if $n_{sub-window}$ is the number of sub-windows, and i is the index of the sub-windows, and i∈[1,$n_{sub-window}$], then $m_i$ (t)

may be denoted as the mean intensity value of a sub-window i at time t, thereby giving:

$$m_i(t) = \frac{1}{n_{pixel}} \sum_{(x,y) \in \text{Window\_i}} I(x, y, t) \quad (3)$$

Therefore, for each sub-window 210 in the region of interest, the intensities of all the pixels in that sub-window are summed, and the mean pixel intensity for that sub-window is calculated. Then the entropy is calculated on the sub-window level.

After calculating the entropy for each sub-window in the region of interest, those entropies are normalized over space and time in operation 150. Specifically, in an embodiment, the normalized entropy is calculated according to the following equation:

$$D^*(i, t) = \begin{cases} 1 & \text{if } |m_i(t) - m_i(t-\tau)| > \varepsilon^* \\ 0 & \text{otherwise} \end{cases} \quad (4)$$

$$\text{entropy} = \frac{1}{T} \frac{1}{n_{sub-window}} \sum_i D^*(i, t). \quad (5)$$

If, in an example, the video system operates at 30 frames per second, then the value of τ may be 5 frames. In an embodiment, T should be large enough to encompass the temporal extent of the behavior. For example, if the behavior is a fight between two or more people, and the video system functions at 30 frames per second, the value of T may be around 40 to 60 frames. In this embodiment, the assumption is made that the behavior, in this case a fight, will last for more than one second.

Figure 3:
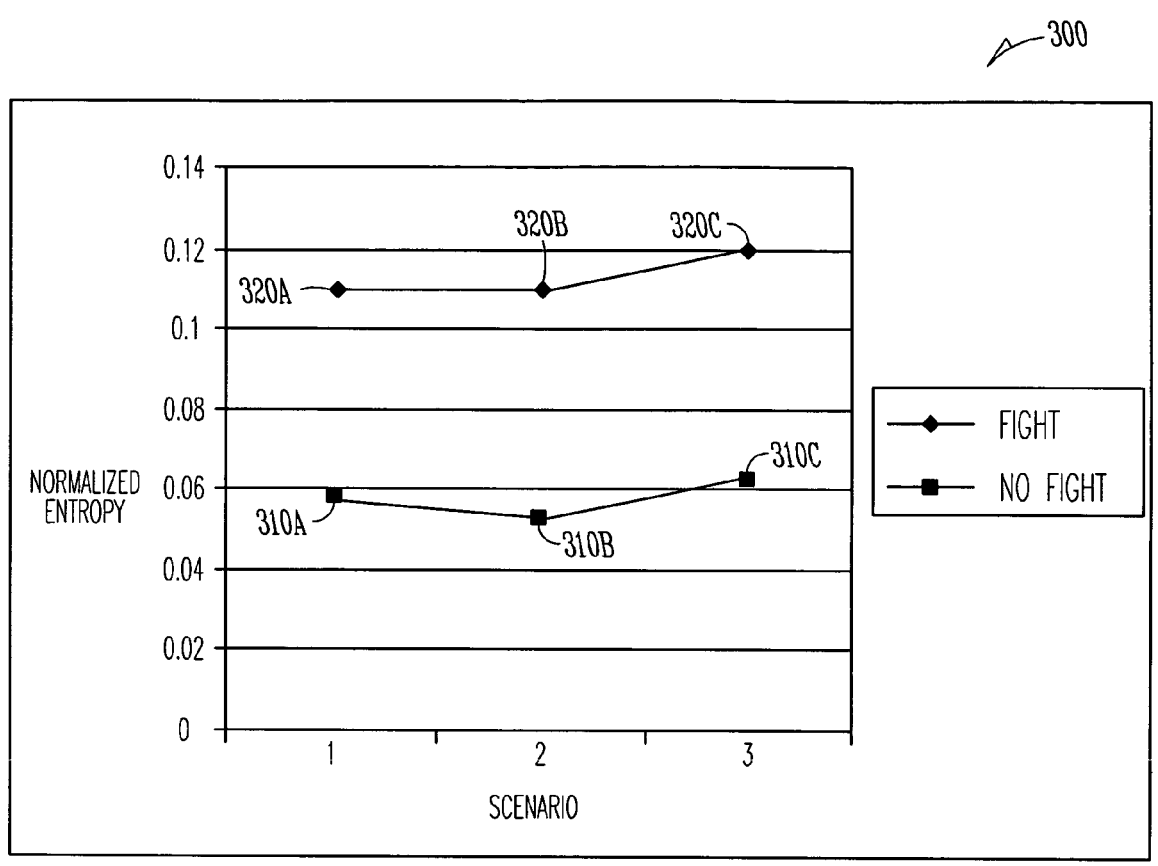
FIG. 3 is a graphical example comparing normalized entropy values for fight video sequences and non-fight video sequences.

After calculating the normalized entropy on either a per pixel or per sub-window basis for a video scene during a particular period of time, the normalized entropy is compared to a threshold entropy value at operation 155. In an embodiment, the threshold entropy value is calculated in one of the manners just described using a reference scene of two people standing next to each other and engaged in a normal conversation (i.e., two people not engaged in a fight). The normalized threshold entropy value for two or more people standing in close proximity to each other without fighting will be lower than the normalized entropy value that is calculated when two or more people are fighting. Therefore, if the normalized entropy is greater than the reference entropy threshold, the system 100 concludes that the persons in the video scene are involved in a fight or other high velocity/high energy engagement at operation 165. If the normalized entropy is less than or equal to the threshold entropy, the system 100 determines that the persons in the video are not engaged in a fight or other high velocity/high energy engagement at operation 160. In another embodiment, if the normalized entropy is greater, by a certain percentage, than the threshold entropy, the system determines that the people are involved in a fight. FIG. 3 is a graph 300 that illustrates example entropies for image sequences involving a fight and image sequences not involving a fight. The normalized entropies for three non-fight sequences are shown at 310a, 310b, and 310c. The normalized entropies for three fight sequences are shown at 320a, 320b, and 320c. As just explained, these results may indicate that a fight exists in scenarios 1, 2 or 3 (320a, 320b, 320c) either because the normalized entropies for the image sequence is greater than the normalized entropies for the reference sequence, or because the normalized entropies for the image sequence is greater than the normalized entropies for the reference sequence threshold by a certain percentage.

In another embodiment, the system and method of FIG. 1 correlate the pixel elements of the video sensor, and in particular, the field of view of the video sensor, with the real world coordinates of the video image. Such a system is described in U.S. patent application Ser. No. 10/907,877 ("the '877 application"), entitled Systems and Methods for Transforming 2D Image Domain Data Into A 3D Dense Range Map, which is incorporated herein in its entirety for all purposes. Embodiments of the present invention, in connection with the teachings of the '877 application, may then not only determine if two or more people are engaged in a fight, but may also determine the real world location of those persons, so the authorities and/or other concerned persons can be dispatched to that location to deal with the altercation. Such an embodiment involves the 'contact point' of the tracked objects. If the tracked object is a single person/or a group of persons, then the contact point is the medium-bottom pixel in the bounding box of the tracked person. Then, the contact point's pixel value may be mapped to the 3D real world coordinate system. Moreover, the assumption may be made that there is 3D site information of the locations, such as a bank or a subway. Therefore, the system can not only detect the behaviors of a group, such as two persons involved in a fight, but it can also detect such behavior like a group of people standing at the entrance of an escalator, thereby blocking the entrance to the escalator.

Figure 4:
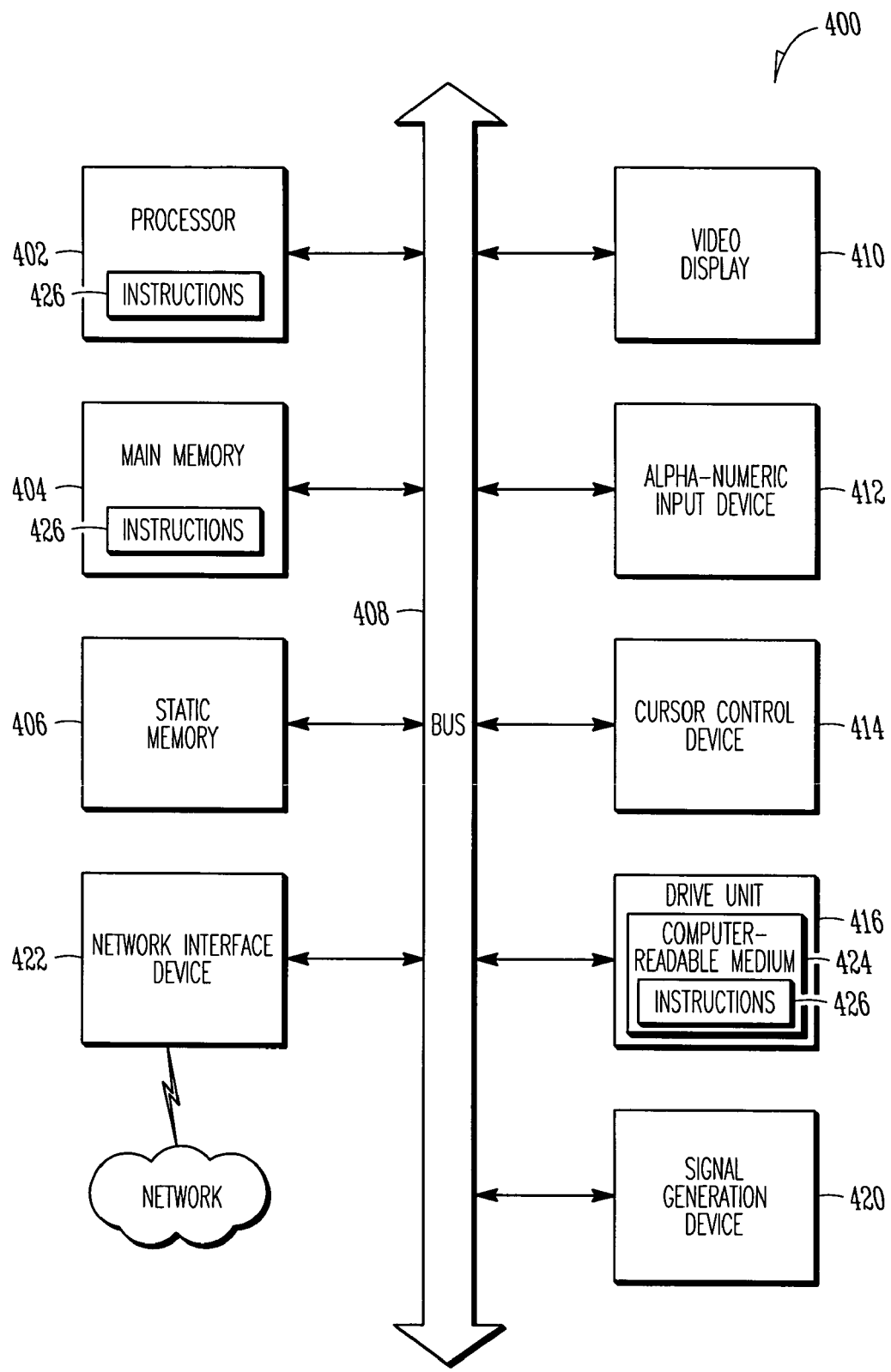
FIG. 4 illustrates an example embodiment of a computer system upon which an embodiment of the present invention may operate.

FIG. 4 shows a diagrammatic representation of a machine in the exemplary form of a computer system 400 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 400 includes a processor 402, a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alpha-numeric input device 412 (e.g. a keyboard), a cursor control device 414 (e.g. a mouse), a disk drive unit 416, a signal generation device 420 (e.g. a speaker) and a network interface device 422.

The disk drive unit 416 includes a machine-readable medium 424 on which is stored a set of instructions (i.e., software) 426 embodying any one, or all, of the methodologies described above. The software 426 is also shown to reside, completely or at least partially, within the main memory 404 and/or within the processor 402. The software 426 may further be transmitted or received via the network interface device 422. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a system and method for motion detection in, object classification of, and interpretation of, video data has been described. Although the present invention has been described with reference to specific exemplary embodiments, it will be evident that various modifications and changes may be made to these embodiments without departing from the broader scope of the invention. Accordingly, the specification and drawings are to be regarded in an illustrative rather than a restrictive sense.

Moreover, in the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A method comprising a computer to perform:
    tracking two or more animate objects in a video scene;
    forming a single blob by combining into the single blob image data corresponding to said two or more animate objects;
    forming a bounding box around said blob; and
    calculating a spatial and temporal entropy value for said bounding box.

2. The method of claim 1, further comprising determining whether said entropy value is greater than a threshold.

3. The method of claim 2, wherein said determining whether said entropy value is greater than said threshold indicates that said two or more animate objects are involved in a fight.

4. The method of claim 1, further comprising determining whether said entropy value is within a certain percentage of a threshold.

5. The method of claim 1, further comprising setting a region of interest around said bounding box.

6. The method of claim 5, wherein said region of interest is approximately 25% greater than said bounding region.

7. The method of claim 6, wherein said entropy value is calculated for said region of interest.

8. The method of claim 1, further comprising normalizing said entropy value.

9. The method of claim 8, wherein said normalized entropy is calculated on a per pixel basis as follows:

$$D(x, y, t) = \begin{cases} 1 & \text{if } |I(x, y, t) - I(x, y, t - \tau)| > \varepsilon \\ 0 & \text{otherwise} \end{cases}$$

wherein
    $D(x, y, t)$ represents a change in intensity of a pixel;
    $\varepsilon$ is a statistical variance; and
    $\tau$ is a time interval; and further wherein the normalized entropy comprises:

$$\text{entropy} = \frac{1}{T} \frac{1}{S_B} \sum_t \sum_{(x,y) \in B} D(x, y, t)$$

wherein
    $S_B$ denotes a size of a region of interest; and
    T denotes a temporal duration of the entropy that is calculated after normalization.

10. The method of claim 8, wherein said normalized entropy is calculated on a per sub-window basis as follows:

$$m_i(t) = \frac{1}{n_{pixel}} \sum_{(x,y) \in \text{Window}\_i} I(x, y, t)$$

wherein
    $m_i(t)$ is the mean intensity value of a sub-window i at time t; and further wherein $$D^*(i, t) = \begin{cases} 1 & \text{if } |m_i(t) - m_i(t - \tau)| > \varepsilon^* \\ 0 & \text{otherwise} \end{cases}$$

wherein
    $\varepsilon$ is a statistical variance; and
    $\tau$ is a time interval; and further wherein $$\text{entropy} = \frac{1}{T} \frac{1}{n_{sub-window}} \sum_i D^*(i, t)$$

wherein
    T denotes a temporal duration of the entropy that is calculated after normalization; and
    $n_{sub-window}$ denotes the number of sub-windows.

11. The method of claim 1, further comprising determining the real world location of said two or more animate objects in said video scene.

12. The method of claim 1, wherein said entropy value comprises a mean intensity.

13. A system comprising a computer to perform:
    a tracking module to track two or more animate objects in a video scene;
    a module to form a single blob by combining into the single blob image data corresponding to said two or more animate objects;
    a module to form a bounding box around said blob; and
    a calculation module to calculate a spatial and temporal entropy value for said bounding box.

14. The system of claim 13, further comprising a module to:
set a region of interest around said blob;
calculate said entropy value for said region of interest; and
normalize said entropy value.

15. The system of claim 13, wherein said module to normalize said entropy value is on a pixel basis and comprises:

$$D(x, y, t) = \begin{cases} 1 & \text{if } |I(x, y, t) - I(x, y, t - \tau)| > \varepsilon \\ 0 & \text{otherwise} \end{cases}$$

wherein
$D(x, y, t)$ represents a change in intensity of a pixel;
$\varepsilon$ is a statistical variance; and
$\tau$ is a time interval; and further wherein the normalized entropy comprises:

$$\text{entropy} = \frac{1}{T} \frac{1}{S_B} \sum_t \sum_{(x,y) \in B} D(x, y, t)$$

wherein
$S_B$ denotes a size of a region of interest; and
T denotes a temporal duration of the entropy that is calculated after normalization.

16. The system of claim 13, wherein said module to normalize said entropy value is on a sub-window basis and comprises:

$$m_i(t) = \frac{1}{n_{pixel}} \sum_{(x,y) \in \text{Window\_i}} I(x, y, t)$$

wherein
$m_i(t)$ is the mean intensity value of a sub-window i at time t; and further wherein $$D^*(i, t) = \begin{cases} 1 & \text{if } |m_i(t) - m_i(t - \tau)| > \varepsilon^* \\ 0 & \text{otherwise} \end{cases}$$

wherein
$\varepsilon$ is a statistical variance; and
$\tau$ is a time interval; and further wherein $$\text{entropy} = \frac{1}{T} \frac{1}{n_{sub-window}} \sum_i D^*(i, t)$$

wherein
T denotes a temporal duration of the entropy that is calculated after normalization; and
$n_{sub-window}$ denotes the number of sub-windows.

17. A machine readable medium having stored instructions thereon for executing a process comprising:
tracking two or more animate objects in a video scene;
forming a single blob by combining into the single blob image data corresponding to said two or more animate objects;
forming a bounding box around said blob; and
calculating a spatial and temporal entropy value for said bounding box.

18. The machine readable medium of claim 17, further comprising comparing said entropy value to a threshold to determine whether said entropy value is greater than said threshold or said entropy value is within a certain percentage of said threshold.

19. The machine readable medium of claim 17, wherein said entropy value is normalized on a per pixel basis and comprises:

$$D(x, y, t) = \begin{cases} 1 & \text{if } |I(x, y, t) - I(x, y, t - \tau)| > \varepsilon \\ 0 & \text{otherwise} \end{cases}$$

wherein
$D(x, y, t)$ represents a change in intensity of a pixel;
$\varepsilon$ is a statistical variance; and
$\tau$ is a time interval; and further wherein the normalized entropy comprises:

$$\text{entropy} = \frac{1}{T} \frac{1}{S_B} \sum_t \sum_{(x,y) \in B} D(x, y, t)$$

wherein
$S_B$ denotes a size of a region of interest; and
T denotes a temporal duration of the entropy that is calculated after normalization.

20. The machine readable medium of claim 17, wherein said entropy value is normalized on a per sub-window basis and comprises:

$$m_i(t) = \frac{1}{n_{pixel}} \sum_{(x,y) \in \text{Window\_i}} I(x, y, t)$$

wherein
$m_i(t)$ is the mean intensity value of a sub-window i at time t; and further wherein $$D^*(i, t) = \begin{cases} 1 & \text{if } |m_i(t) - m_i(t - \tau)| > \varepsilon^* \\ 0 & \text{otherwise} \end{cases}$$

wherein
$\varepsilon$ is a statistical variance; and
$\tau$ is a time interval; and further wherein $$\text{entropy} = \frac{1}{T} \frac{1}{n_{sub-window}} \sum_i D^*(i, t)$$

wherein
T denotes a temporal duration of the entropy that is calculated after normalization; and
$n_{sub-window}$ denotes the number of sub-windows.

* * * * *